(12) United States Patent
Berkel

(10) Patent No.: US 8,990,999 B1
(45) Date of Patent: Mar. 31, 2015

(54) ATTACHABLE WIPER ASSEMBLY FOR A WINDSHIELD

(71) Applicant: David A Berkel, Union, MO (US)

(72) Inventor: David A Berkel, Union, MO (US)

(*) Notice: Subject to any disclaimer, the term of this patent is extended or adjusted under 35 U.S.C. 154(b) by 186 days.

(21) Appl. No.: 13/886,681

(22) Filed: May 3, 2013

Related U.S. Application Data

(60) Provisional application No. 61/706,985, filed on Sep. 28, 2012.

(51) Int. Cl.
*B60S 1/24* (2006.01)
*B60S 1/06* (2006.01)
*B62J 17/04* (2006.01)
*B60S 1/32* (2006.01)
*B60S 1/04* (2006.01)

(52) U.S. Cl.
CPC ............... *B60S 1/32* (2013.01); *B60S 1/0497* (2013.01); *B60S 1/24* (2013.01); *B60S 1/0441* (2013.01); *B62J 17/04* (2013.01)
USPC ........................................... 15/250.3

(58) Field of Classification Search
CPC ............ B60S 1/24; B60S 1/04; B60S 1/0438; B60S 1/0441; B60S 1/0447; B62J 17/04; B62J 17/00
USPC .................... 296/78.1, 96.15, 96.17; 15/250.3
See application file for complete search history.

(56) References Cited

U.S. PATENT DOCUMENTS

| | | | | |
|---|---|---|---|---|
| 3,448,480 A * | 6/1969 | Couget | | 15/250.001 |
| 4,027,354 A | 6/1977 | Burpee | | |
| 4,066,291 A | 1/1978 | Hickman | | |
| 4,316,303 A * | 2/1982 | Penn | | 15/250.3 |
| 4,529,242 A | 7/1985 | Watanabe | | |
| 5,274,876 A | 1/1994 | Wehrspann | | |
| 5,755,140 A | 5/1998 | Turbessi | | |
| 5,816,099 A | 10/1998 | Turbessi | | |
| 5,832,775 A | 11/1998 | Turbessi | | |
| 5,853,217 A | 12/1998 | Armstrong | | |
| 6,270,142 B1 | 8/2001 | Danielsen | | |
| 6,324,719 B1 * | 12/2001 | Ritacco | | 15/250.3 |
| 7,424,765 B1 * | 9/2008 | Stevens | | 15/250.29 |

FOREIGN PATENT DOCUMENTS

DE    2913635 C2 *    3/1981

* cited by examiner

*Primary Examiner* — Gary Graham

(57) ABSTRACT

A portable, attachable and removable wiper assembly for a windshield having a motor housing containing a motor and a wiper blade joined to the motor by a linkage arm with an upper support clamp joined proximally to the top of the motor housing which is suitable for clamping to the vertical side of the windshield and a horizontal support bracket joined proximally to the bottom of the motor housing, extending horizontally along the bottom of the windshield, wherein the wiper blade is mounted on the horizontal support bracket and extends vertically therefrom to oscillate. The wiper assembly does not require any modification of the windshield to be used.

3 Claims, 8 Drawing Sheets

ATTACHABLE WIPER ASSEMBLY FOR A WINDSHIELD

CROSS-REFERENCE TO RELATED APPLICATIONS

This application claims the right of priority to provisional patent application 61/706,985 filed Sep. 28, 2012, which is hereby incorporated by reference.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to a windshield wiper, and more particularly to an attachable wiper assembly for a windshield.

2. Related Art

Motorcycles can be vulnerable to extreme weather conditions including rain. When a motorcycle rider encounters rainy conditions, looking through the windshield becomes difficult, if not impossible. Bad visibility obviously presents a serious safety problem. Accordingly, the rider typically must pull over and wait for the rain to stop. Alternatively, the rider may continue riding by looking over the top of the windshield as is recommended by most motorcycle manufacturers. Unfortunately, looking over the top of the windshield only transfers the visibility problem from the windshield to the rider's visor, glasses or goggles. By keeping sight through the windshield, rather than over it, most of the rain is avoided on the rider's glasses.

Generally, windshield wipers are not seen on motorcycles. First, motorcycles are the only licensed vehicles that are not required by law to be equipped with windshield wipers. Accordingly, if not required to do so, most riders will not use a windshield wiper despite the safety advantages. Second, the esthetics of a windshield wiper presents an issue. Most motorcycle riders do not like the looks of their motorcycles being altered by the presence of a permanently mounted windshield wiper.

Some types of windshield wipers are known in the prior art, but they unfortunately do not meet all of the safety concerns involved with windshield wipers as well are unsightly. For example, many motorcycle windshield wipers are permanently attached and require holes to be drilled in the motorcycle. Other examples include the Le Wipe, which is a hand operated wiper that requires the rider to remove his hand from the handlebar to operate, thus producing a safety hazard by distracting the driver. Additionally, the wiper obstructs the rider's view through and over the windshield. There is also a potentially dangerous situation where the unit can unexpectedly dislodge from the windshield and fall off. A safety lanyard is attached to the wiper assembly to catch the falling unit.

Another example of a motorcycle windshield wiper is provided in the MIT publication "Design of a Modular Motorcycle Windshield Wiper". The horizontal wiper blade moves up and down vertically along the windshield. This action captures water behind the blade on the upward stroke then releases that captured water on the downward stroke effectively nullifying its effectiveness. Moreover, motorcycle windshields have more horizontal curvature than other vehicle windshields. The blade of the MIT device would not properly conform to the motorcycle windshield curvature since wiper blades are made to run on the vertically flat surface rather than the horizontally curved surface. Due to the vertical action of the wiper blade, the geometry of the wiped surface further reduces the field of view through the windshield. The MIT design also does not incorporate the ability to vary the speed of the wiper for different rain conditions.

A need remains for a motorcycle windshield wiper that satisfies both the safety and esthetic concerns with motorcycle windshield wipers. A further need remains for an attachable and removeable wiper for any type of windshield, including motorcycle, boats, recreational vehicles, etc.

Examples of known prior art devices are described in the references listed below. "Design of a Modular Motorcycle Windshield Wiper" June 2010 Robert Allen Michael Boyd— MIT "Le Wipe"<http:www.ebay.com/sch/i.html?_nkw=windshield+wipers>

| | |
|---|---|
| U.S. Pat. No. 5,816,099 | U.S. Pat. No. 6,270,142 |
| U.S. Pat. No. 4,027,354 | U.S. Pat. No. 4,066,291 |
| U.S. Pat. No. 4,529,242 | U.S. Pat. No. 5,274,876 |
| U.S. Pat. No. 5,755,140 | U.S. Pat. No. 5,816,099 |
| U.S. Pat. No. 5,832,775 | U.S. Pat. No. 5,853,217 |
| U.S. Pat. No. 6,270,142 | |

SUMMARY OF THE INVENTION

The present invention is an attachable and removeable wiper assembly suitable for a motorcycle, boat or other vehicle windshield, where the assembly has a motor housing and a wiper blade joined to the motor housing by a linkage arm. An upper clamp is joined proximally to the top of the motor housing and clamps to a side of the motorcycle windshield. A horizontal support bracket is joined proximally to the bottom of the motor housing and extends along a bottom of the motorcycle windshield. The horizontal support bracket includes a lower clamp to clamp to the bottom of the windshield. The horizontal support bracket is also adjustable in length to accommodate different size windshields. The wiper blade is mounted on the horizontal support bracket and extends vertically from there. In particular, a wiper arm is pivotably mounted on the horizontal support bracket and the wiper blade joined to the wiper arm so that the wiper blade pivots within a range of 45 degrees to 135 degrees with respect to the horizontal support bracket.

The motor housing covers a motor that drives an output shaft and a crank arm. The linkage arm is coupled between the crank arm and the wiper arm so that the motor drives the wiper arm. A rheostat may be used to adjust the speed of the wiper arm. The wiper assembly may be powered by the motorcycle using a power outlet or the wiper assembly may be battery powered. In a preferred embodiment, the wiper assembly is removably attachable to the windshield.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention provides a motorcycle windshield wiper assembly that is portable and removably installed on the motorcycle without making permanent mounting or modifications to the motorcycle or the motorcycle's components. More particularly, the windshield of the motorcycle does not have to have holes drilled into it to mount the wiper assembly. The wiper assembly is adjustable to fit a variety of different size windshields. The wiper assembly may be powered by the motorcycle and/or include a self-contained battery. Additionally, the wiper assembly may include a variable wiper speed control.

Figure 1:
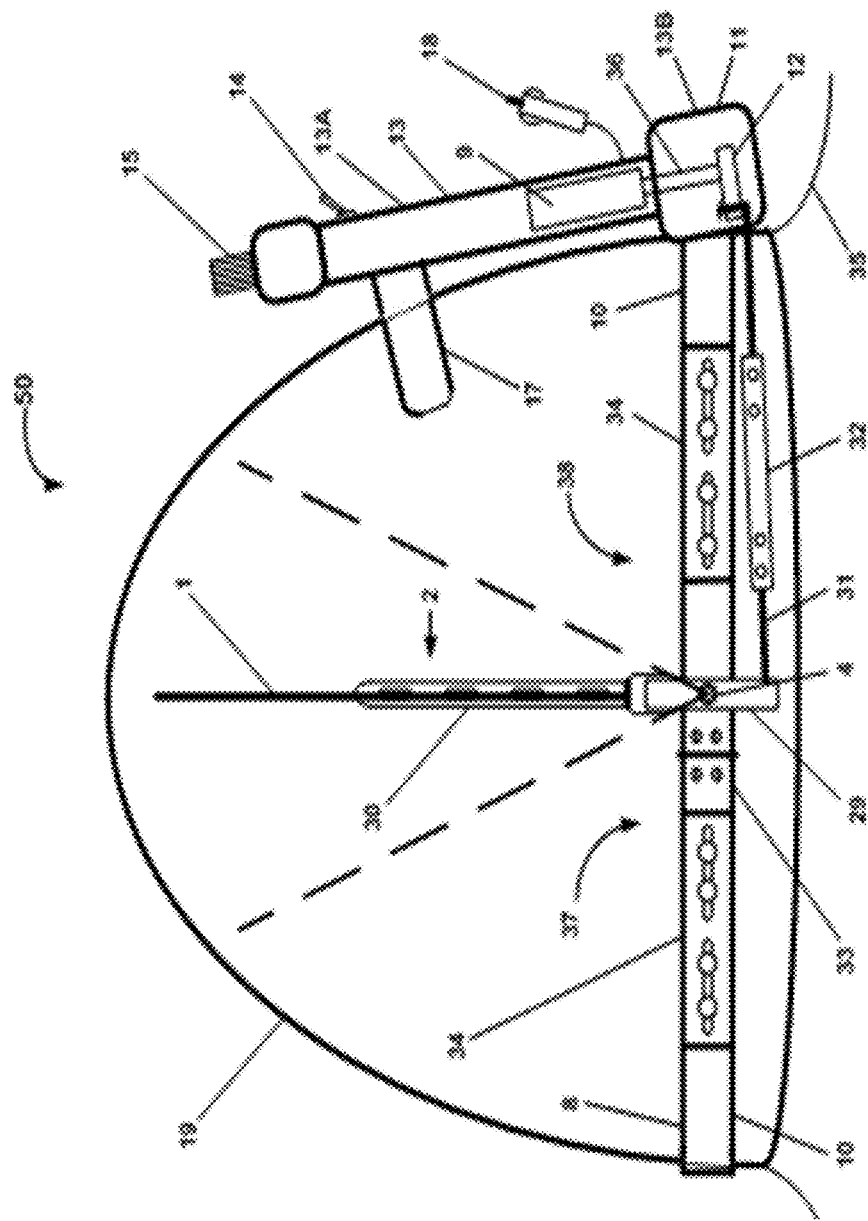
FIG. 1 is a front view schematic of a windshield wiper assembly formed in accordance with a first embodiment of the present invention.

As illustrated in FIG. 1, the wiper assembly 50 includes a motor housing 13 that contains a direct current (DC) electric motor 9. In the illustrated embodiment, the motor housing 13 is approximately cylindrical, but may the housing may have any suitable shape for use with a motorcycle. Preferably, the housing is water-tight and made out of metal. A preferred metal is aluminum, but composites or plastics are also suitable. The motor housing 13 is designed to position near the side edge of the motorcycle windshield 19 to minimize blocking the driver's vision. The cylindrical shape of the motor housing 13 allows the housing to be positioned along the edge of the windshield 19 without substantially affecting the aerodynamic design of the windshield. Accordingly, the wiper assembly 50 has little to no effect on the performance of the motorcycle. In one embodiment, the motor 9 is a DC electric motor with gear reduction; however other motors may be suitable. Optionally, a battery compartment is provided within the housing to receive at least one battery to power the motor. The at least one battery may be a standard household battery, for example a D battery, or the at least one battery may be a rechargeable battery. A power switch 14 is electrically coupled to the motor 9 to actuate the motor 9. An output shaft 36 extends from the motor 9 at the bottom of the motor housing 13. The motor 9 rotates the output shaft 36 about an axis of the motor when the motor 9 is activated.

A crank arm 12 is mounted to the output shaft 36 to convert the rotational motion of the output shaft 36 to a linear oscillating motion that activates a wiper arm 2. The crank arm 12 is housed in the crank arm shield 11. An adjustable rheostat 15 is positioned at the top of the housing 13 to vary the speed of the motor 9, and consequently the output shaft 36, crank arm 12, and wiper arm 2. In one embodiment, an accessory power cord and plug 18 are electrically coupled to the motor 9 to power the motor from the motorcycle. For example, the plug may be a standard cigarette lighter plug that is used when operating the wiper assembly from a motorcycle 12-volt electrical system. Accordingly, the wiper assembly 50 may be powered by battery or by the motorcycle electrical system. In one embodiment, the batteries may be rechargeable from the motorcycle electrical system.

An upper clamp 17 is fixed to the top of the motor housing 13A. The upper clamp assembly 17 may be formed from metal, plastic, or any suitable material that can withstand motorcycle riding conditions without become damaged or deformed. Preferably, the clamp 17 is made of aluminum. In particular, the upper clamp 17 is attached to the top of the motor housing 13A using support bushing 26, which is attached to the top of the housing. The upper clamp 17 is either frictionally fit onto the vertical edge of the windshield, or is manually tightened to be fixed on the edge of the windshield. The upper clamp 17 includes a slot 37 through which the edge of the windshield is received. Clamp cushions 24 are provided on the inner surfaces of the slot 37 to grip the windshield. At the back of slot 37 is a rubber windshield cushion 27, against which the vertical edge of the windshield 19 can rest without being damaged. Moreover, the cushions 24 are pliable so that the clamp 17 can be joined to windshields having various thicknesses.

A horizontal support bracket 8 is fixed to the bottom of the motor housing 13B and extends outward therefrom. The horizontal support bracket 8 may be formed from metal, plastic, or any suitable material that can withstand motorcycle riding conditions without become damaged or deformed. A preferred metal is aluminum. In the first embodiment of this invention, the horizontal support bracket 8 attaches to each side of the windshield 19 along a lower portion of the windshield and extends across the lower portion of the windshield. Both ends of the horizontal support bracket 8 includes a cushioned lower clamp assembly 10 that secures to the windshield 19 and prevents damage and scratching to the windshield from the horizontal support bracket 8. The lower clamp 10 includes a slot 37 through which the edge of the windshield 19 is received.

Figure 3:
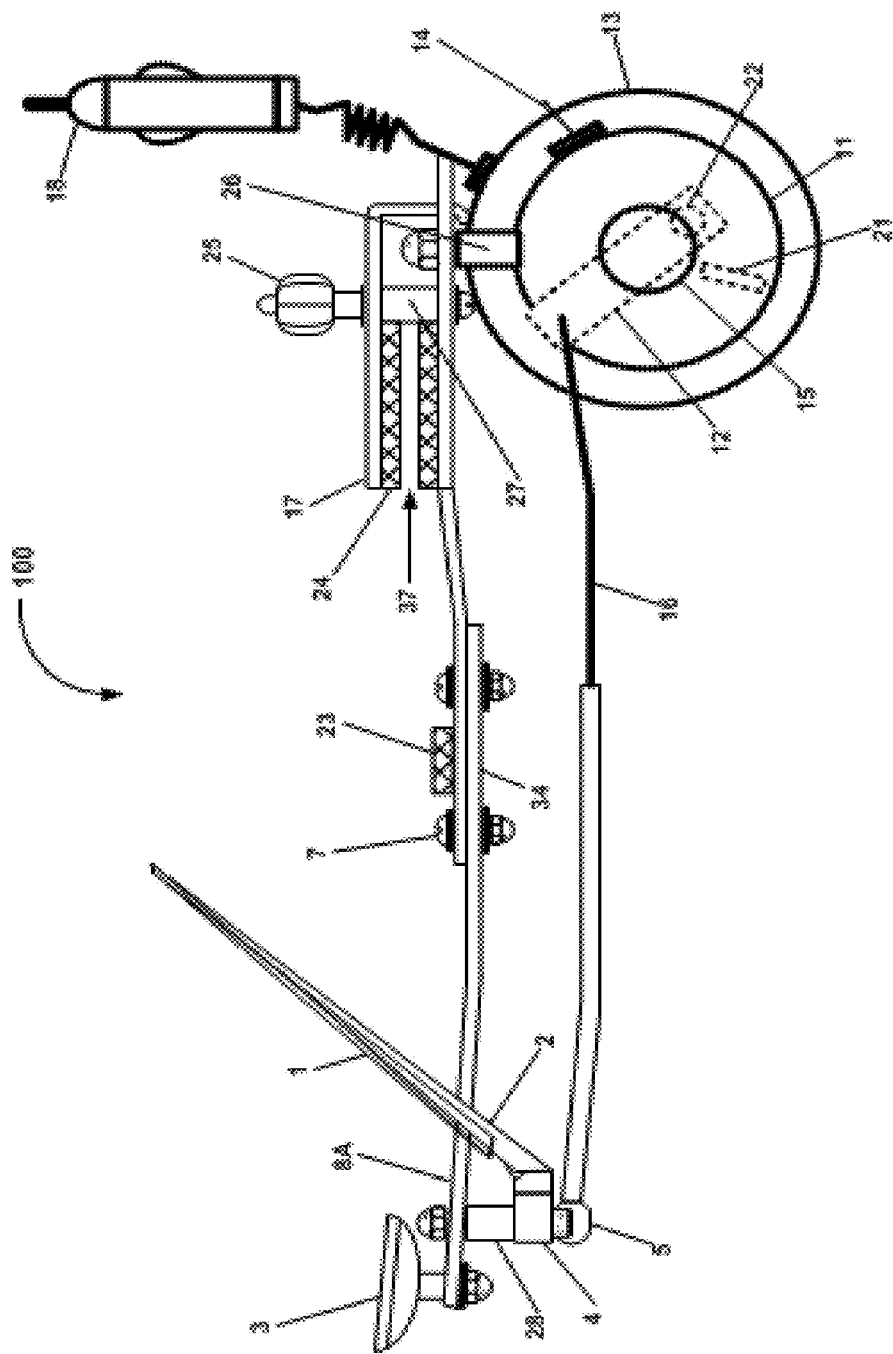
FIG. 3 is a top perspective view schematic of a windshield wiper assembly formed in accordance with a second embodiment of the present invention.
Figure 5:
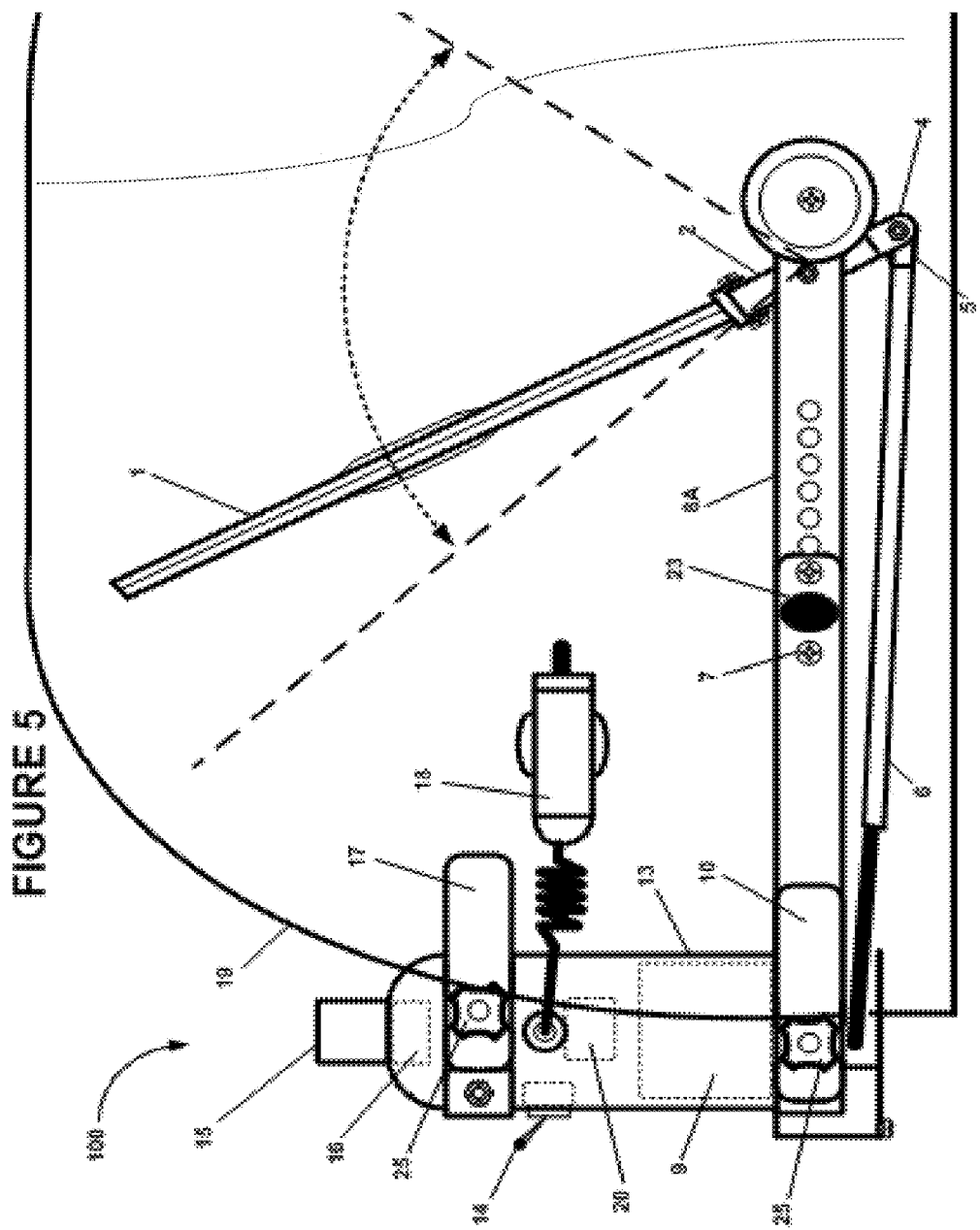
FIG. 5 is a rear view schematic of a windshield wiper assembly formed in accordance with a second embodiment of the present invention.

The cushions 24 are provided on the inner surfaces of the slot 37 to facilitate the frictional fit with the windshield and to protect the windshield from scratching. The cushions 24 are also pliable so that the clamp can be joined to windshields having various thicknesses. The lower clamp 10 is either frictionally fit onto the vertical edge of the windshield, or is manually tightened to be fixed on the edge of the windshield. As shown in FIGS. 3 and 5, in a preferred embodiment, the upper clamp 17 and the lower clamp 10 are manually tightened using clamping knobs 25. The horizontal support bracket 8 includes bracket cushion 23 positioned between the bracket 8 and the windshield 19, to prevent damage to the windshield. In one embodiment, the cushion is 3/16" thick adhesive backed rubber cushioning that is adhered to the horizontal support bracket 8.

As shown in FIG. 1, in a first embodiment of the invention, the horizontal support bracket 8 is hinged at approximately the center of the horizontal support bracket 8 to allow the bracket to be folded into a smaller package capable of being stored on the motorcycle, for example, in a storage compartment of the motorcycle or in a rider's pack. The hinge 33 separates the horizontal support bracket 8 into a first section 37 and a second section 38. Each of the first section 37 and the second section 38 of the horizontal support bracket 8 includes adjustment mechanisms 34 to adjust the length of the section. Preferably, the mechanism comprises two overlapping sections. Adjustment is made by aligning the slots or holes and fastening with appropriate devices such as nuts and studs, screws, bolts, cotter pins, etc. In a preferred embodiment, the adjustment mechanism 34 includes slots having a screw positioned therein. Alternatively, the adjustment mechanism 34 can have spaced openings that align having a screw, bolt, cotter pin or stud 7 positioned therein. Each section is adjustable so that the screw is maintained in the slot. Once the desired length of the section is obtained, the screw is secured at the desired length. In one embodiment, the screw may include a wing nut so that the screw can be operated without the use of tools. The adjustable sections enable the horizontal support bracket 8 to be sized to fit various different windshields 19. In particular, the horizontal support bracket 8 may be adjusted to accommodate windshields having various widths.

The horizontal support bracket 8 provides a mounting point for the wiper arm 2. A wiper arm pivot joint 4 is mounted on the horizontal support bracket 8. In the first embodiment, it is mounted substantially in the middle of the horizontal support bracket 8 and proximate to the hinge 33 between the first section 37 and the second section 38. In a preferred embodiment, the wiper arm pivot joint 4 is secured to an end of the first section 37 of the horizontal support bracket 8 proximate to the hinge 33. A lower wiper arm 29 is attached to the wiper arm pivot joint 4. An upper wiper arm 30 is hingedly attached to the lower wiper arm 29 so that the upper wiper arm 30 can be drawn away from the windshield 19. The upper wiper arm 30 includes a spring loaded support arm for a standard rubber wiper blade 1. The spring ensures that the rubber blade 1 contacts the windshield 19 surface evenly.

The lower wiper arm 29 includes a socket joint that is connected to a ball end of a linkage arm. The wiper end of the linkage arm 31 has a ball joint that is coupled to the lower wiper arm 29 socket joint. A tie rod end or any rotational linkage device can be substituted for the ball and socket joint. The motor end of the linkage arm is bent at approximately 90 degrees and secured within a hole in the end of the crank arm 12. The motor end of the linkage arm may be secured to the crank arm with a cotter pin or any other suitable securing mechanism. The linkage arm 31 transfers the linear oscillating motion from the rotating crank arm 12 of the output shaft 36 to the lower wiper arm 29 socket joint. In the illustrated embodiment, the linkage arm 31 has an adjustable link 32 that allows a length of the linkage arm 31 to be adjusted for various sized windshields 19. In particular, the length of the linkage arm 31 is adjustable to accommodate windshields 19 having various widths. In a preferred embodiment, the adjustable link 32 is retained onto the linkage arm 31 with a plurality of screws that can be adjusted to adjust the length of the linkage arm 31.

The wiper assembly 50 is configured to be stored when not in use. In particular, the horizontal support bracket 8 is folded to reduce the size of the wiper assembly 50, i.e., the second section 38 of the lower support bracket is folded about the hinge 33 onto the first section 37 of the horizontal support bracket 8. Additionally, the linkage arm 31 is readily detachable from the crank arm 12 in order to fold the motor housing 13 down and parallel to the lower horizontal support bracket 8A. This allows the unit to fold into a much smaller package for storage. The wiper assembly 50 is capable of being stored in the storage compartment of the motorcycle or in a pack attached to the motorcycle or carried by the rider. When inclement weather begins, the wiper assembly may be quickly attached to the windshield of the motorcycle by securing the upper clamp 17 and the lower clamp 10 to the windshield. Because the wiper assembly does not utilize bolts or any other mechanisms that are secured to the motorcycle, the wiper assembly may be installed and removed without the use of any tools. The wiper assembly is also installed without permanently altering the appearance of the motorcycle or modifying it in any way.

The horizontal bracket 8 may first be adjusted in length so that the lower clamps 10 on each end of the horizontal bracket 8 firmly attach to the lower portion of the windshield. In adjusting the length of the horizontal bracket 8, the length of the linkage arm 31 may also be adjusted to accommodate the size of the windshield. Once the horizontal bracket 8 is secured to the windshield, the upper clamp 17 is firmly positioned on an upper portion of the windshield to hold the entire windshield wiper assembly in place.

When the wiper assembly 50 is positioned on the windshield, the motor housing 13 extends proximate to the windshield 19. Particularly, the motor housing 13 extends along the side of the windshield 19 to which the upper bracket is secured. The wiper assembly 50 may be plugged into a power outlet of the motorcycle or may be operated with batteries. To activate the wiper assembly 50, the power switch 14 on the motor housing 13 is toggled to an on position to activate the motor 9. The motor 9 drives the crank arm 12, and consequently the linkage arm 31 to pivot the wiper arm pivot joint 4 thereby moving the wiper 1 along an arc in a side-to-side motion. The speed of the wiper 1 may be adjusted by operating the rheostat 15 at the top of the motor housing 13.

The wiper moves side-to-side to direct water out of the rider's field of view, as opposed to some wipers which direct the water upward so that the water runs down the field of view when the wiper is in the downward motion. By clearing the rider's field of view, the rider may continue to look through the windshield when riding in inclement weather conditions. As such, the rider has a clear field of view without having to look over the windshield. Additionally, the rider can block water from the rider's goggles or visor by viewing the road through the windshield.

After use, the wiper assembly 50 is removable from the windshield. The assembly may then be folded into a more compact size so that the assembly is easily stored on the motorcycle or within a rider's pack.

Figure 2:
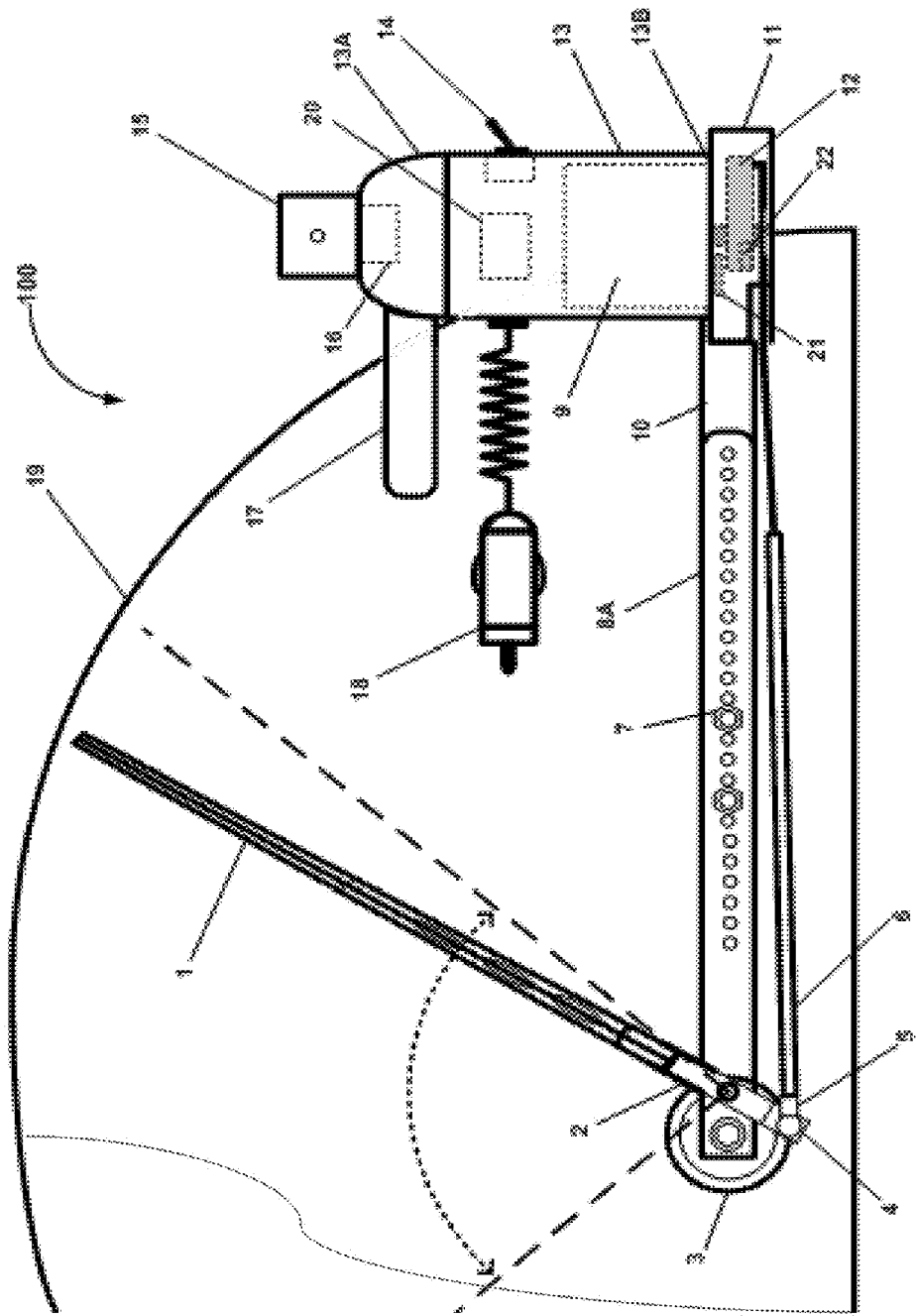
FIG. 2 is a front view schematic of a windshield wiper assembly formed in accordance with a second embodiment of the present invention.

As illustrated in FIGS. 2 and 3 a second embodiment of the invention, the wiper assembly 100 has a horizontal support bracket 8A is fixed to the bottom of the motor housing 13 and extends outward therefrom. The horizontal support bracket 8A may be formed from metal, plastic, or any suitable material that can withstand motorcycle riding conditions without become damaged or deformed. A preferred metal is aluminum. The horizontal support bracket 8A attaches to the side of the windshield 19 where the motor housing 13 is attached, along a lower portion of the windshield. The terminus of the support bracket 8A is approximately at the center of the windshield 19. The motor housing 13 end of the horizontal support bracket 8A includes a cushioned lower clamp assembly 10 that secures to the windshield 19 and prevents damage and scratching to the windshield from the horizontal support bracket 8A. The horizontal support bracket 8A includes cushion 23. In particular, the cushion 23 sits between the horizontal support bracket and the windshield to space the lower support bracket from the windshield. In one embodiment, the cushion is 3/16" thick adhesive backed rubber cushioning that is adhered to the horizontal support bracket 8A.

A wiper arm pivot joint 4 is mounted on the horizontal support bracket 8A near its terminus. To secure the terminus end of the horizontal support bracket 8A to the windshield 19, a suction cup 3 is secured to the terminus end and is positioned between the horizontal support bracket 8A and the windshield 19. To secure the tie rod end 5 and the wiper arm pivot joint 4 proximate to the terminus of the horizontal support bracket 8A, a pivot shaft bushing 28 is used to provide the spacing required for clearance of the wiper blade to oscillate without being hindered by the horizontal support bracket 8A.

The horizontal support bracket 8A includes adjustment mechanism 34 to adjust the length of the section. The length of the horizontal support bracket 8A may be adjusted so that the clamp 10 and the suction cup 3 firmly attach to the lower portion of the windshield 19. The horizontal support bracket 8A provides a mounting point for the wiper arm 2. Preferably, the wiper blade 1 is easily attached and removed from the wiper arm 2. More preferably, commercially available wiper blades mount onto the wiper arm 2.

Optionally, the crank arm 12 can have a magnet 22 attached to the crank arm 12 on the opposite side of the tie rod 6 attachment. The magnet 22, as the crank arm 12 rotates, moves past a magnetic reed switch 21 fastened immovably to the crank arm shield 11, proximate to the magnet 22, thereby activating the switch 21 when it is proximate to it. When the power switch 14 is turned to the off position thereby turning the power to the motor 9 off, the magnetic reed switch 21 moves the wiper blade 1 to the side of the wind shield 19, out of the line of vision of the driver.

Figure 4:
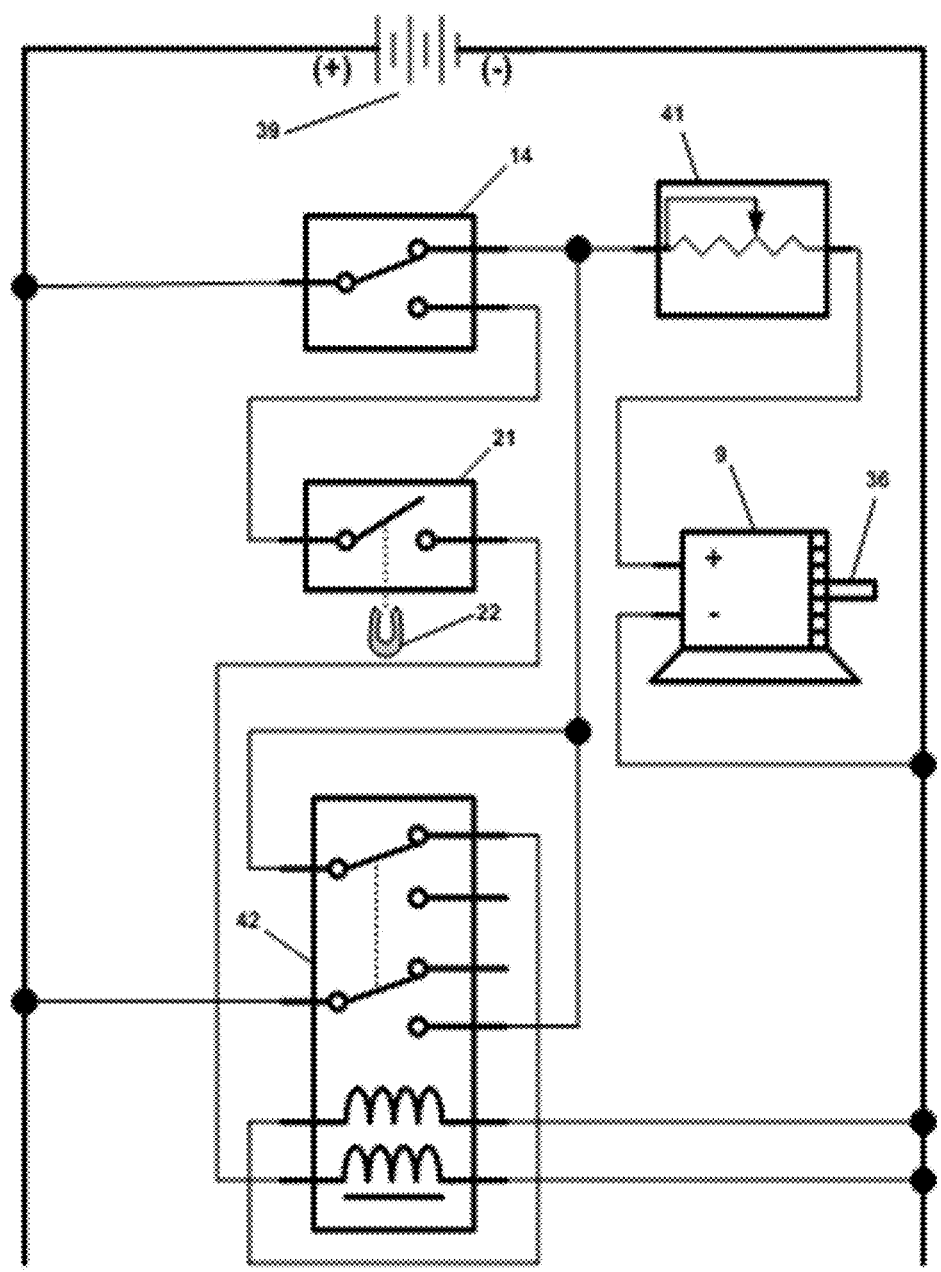
FIG. 4 is a wiring diagram of the second embodiment of the present invention.

As illustrated in FIG. 4, the wiring diagram of wiper assembly 100 with the optional magnet 22 and magnetic reed switch 21. Power is provided by a battery source 39, either within the motor housing 13 or provided by the motor cycle. The power switch 14 is attached to the battery, and the magnetic reed switch 21. The magnetic reed switch 21 is proximate to the magnet 22. The speed of the motor 9, with motor output shaft 36 is varied using the potentiometer 41. The latching relay 42 is connected to the magnetic reed switch 21 and the power switch 14.

Figure 6:
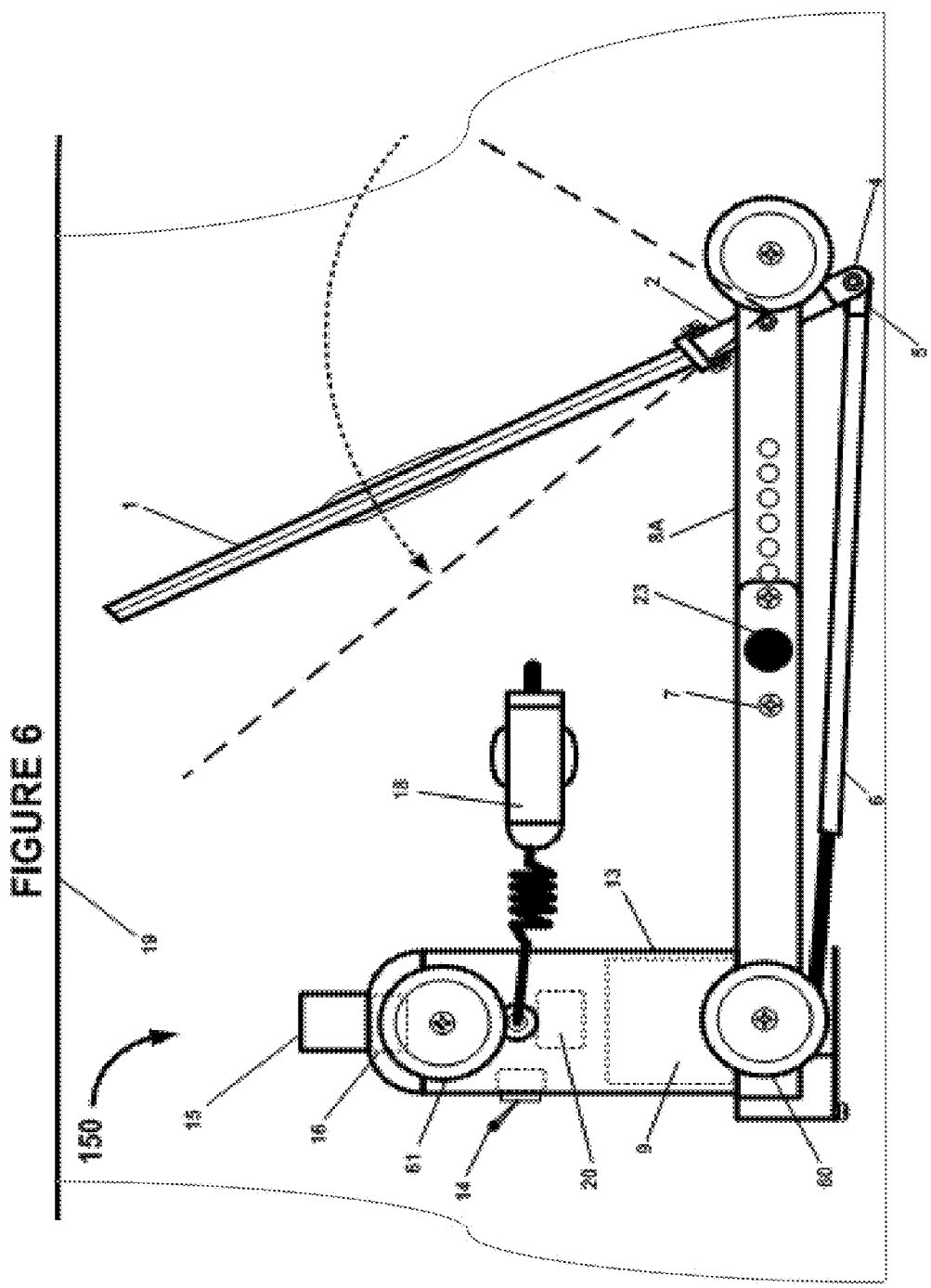
FIG. 6 is a rear view schematic of a windshield wiper assembly formed in accordance with a third embodiment of the present invention.
Figure 7:
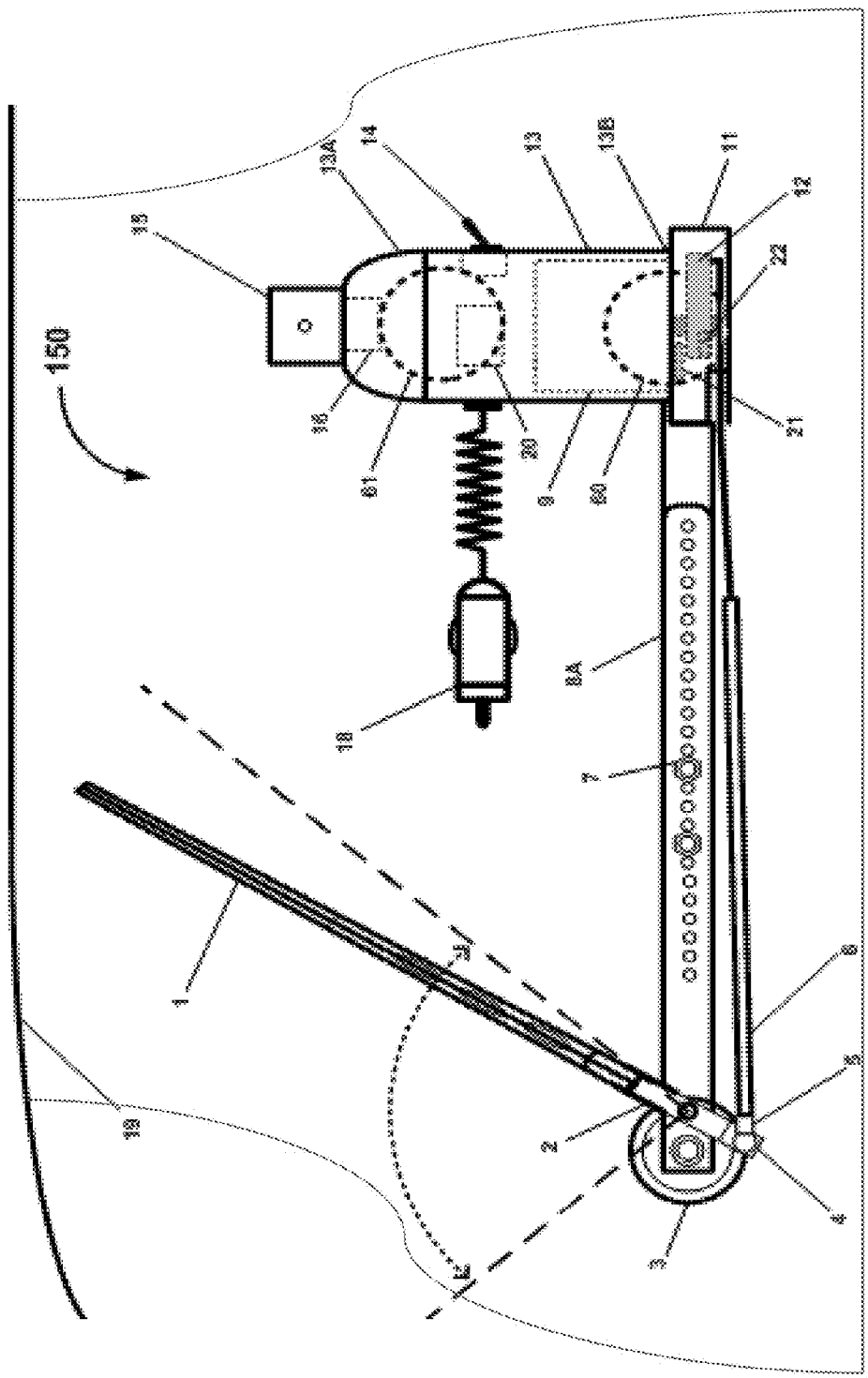
FIG. 7 is a front view schematic of a windshield wiper assembly formed in accordance with a third embodiment of the present invention.
Figure 8:
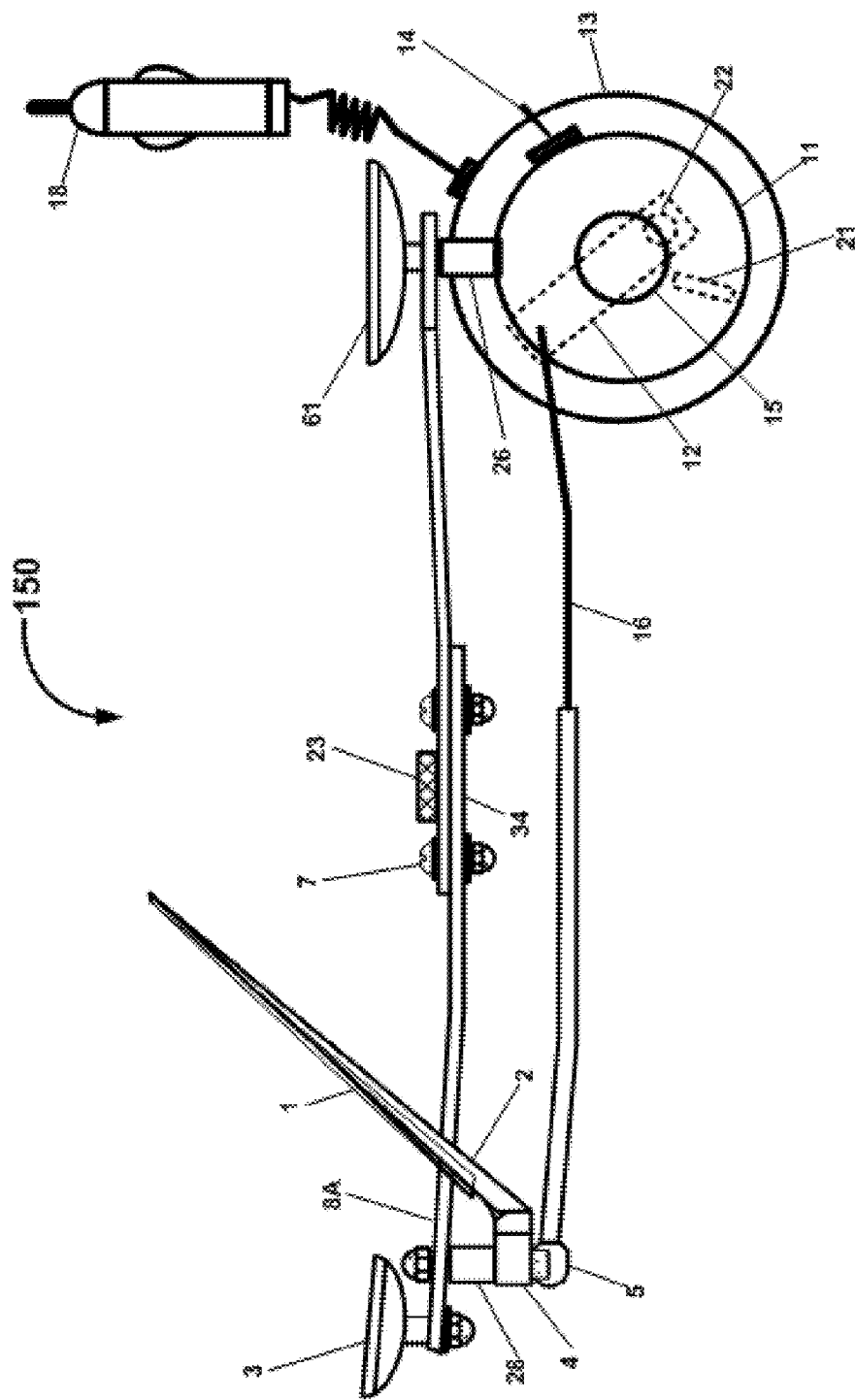
FIG. 8 is a top perspective view schematic of a windshield wiper assembly formed in accordance with a third embodiment of the present invention.

A third embodiment of the present invention is shown in FIGS. 6, 7 and 8, and is suitable for windshields that do not have a vertical edge readily available on which to attach a lower clamp or an upper clamp, such as a boat windshield. The third embodiment is a modification of the second embodiment in that horizontal support bracket 8A is fixed to the bottom of motor housing 13 and extends outward therefrom, but is not attached to the vertical edge of the windshield. Rather, the motor housing 13 is attached to the windshield using an upper motor housing suction cup 61 and a lower motor housing suction cup 60. This third embodiment, as well as the first and second embodiments may optionally include additional suction cups or fastening devices, such as adhesives or loop and hook fasteners as needed to fasten the wiper assembly to the windshield 19. The upper motor housing suction cup 61 is attached to the top of the motor housing 13A using support bushing 26, which is attached to the top of the housing.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A wiper assembly for a windshield comprising:
   a motor housing with a motor contained therein;
   wherein the motor has a shaft;
   wherein attached to the shaft is a crank arm;
   wherein the housing has a top and a bottom;
   wherein the motor has a means of electrically connecting to a power source;
   a wiper blade joined to the crank arm by a linkage arm;
   an upper motor housing suction cup joined proximally to the top of the motor housing;
   a horizontal support bracket having a terminus end and a motor housing end,
   wherein the horizontal support bracket is joined proximally to the bottom of the motor housing;
   wherein the horizontal support bracket has a lower motor housing suction cup proximate to the motor housing;
   wherein the horizontal support bracket has wiper blade pivotably attached near its terminus end in a vertical orientation;
   wherein the terminus end of the horizontal support bracket has a terminus suction cup; and
   wherein the upper motor housing suction cup, the lower motor housing suction cup, and the terminus suction cup are used to attach the horizontal support bracket to the windshield.

2. The wiper assembly of claim 1 wherein the crank arm has a magnet attached to the crank arm and an magnetic reed switch immovably affixed proximate to the crank arm, wherein as the crank arm rotates and moves past the magnetic reed switch, the magnetic reed switch is activated, and when a power switch is turned to an off position, the magnetic reed switch moves the wiper blade to a side of the windshield, out of a line of vision of a driver.

3. The wiper assembly of claim 1 further comprising a wiper arm pivotably positioned at the terminus end of the horizontal support bracket, wherein the wiper blade is joined to the wiper arm.

* * * * *